(12) United States Patent
Lv

(10) Patent No.: US 11,506,946 B1
(45) Date of Patent: Nov. 22, 2022

(54) ARRAY SUBSTRATE AND LIQUID CRYSTAL DISPLAY PANEL

(71) Applicant: TCL CHINA STAR OPTOELECTRONICS TECHNOLOGY CO., LTD., Shenzhen (CN)

(72) Inventor: Xiaowen Lv, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/419,668

(22) PCT Filed: May 18, 2021

(86) PCT No.: PCT/CN2021/094388
§ 371 (c)(1),
(2) Date: Jun. 29, 2021

(30) Foreign Application Priority Data

Apr. 28, 2021 (CN) .......................... 202110465341.6

(51) Int. Cl.
*G02F 1/1343* (2006.01)
(52) U.S. Cl.
CPC .... *G02F 1/13439* (2013.01); *G02F 1/134309* (2013.01)
(58) Field of Classification Search
None
See application file for complete search history.

(56) References Cited

U.S. PATENT DOCUMENTS

| 2003/0017655 | A1* | 1/2003 | Lai | G02F 1/13439 257/E21.414 |
| 2015/0372011 | A1* | 12/2015 | Zhang | H01L 27/124 438/158 |
| 2019/0094638 | A1* | 3/2019 | Li | G02F 1/134309 |

FOREIGN PATENT DOCUMENTS

| CN | 103985717 A | 8/2014 |
| CN | 104656315 A | 5/2015 |
| CN | 107479292 A | 12/2017 |
| CN | 108008582 A | 5/2018 |
| CN | 110928093 A | 3/2020 |
| JP | 2000122071 A | 4/2000 |

OTHER PUBLICATIONS

International Search Report in International application No. PCT/CN2021/094388, dated Jan. 26, 2022.

* cited by examiner

*Primary Examiner* — Ryan Crockett
(74) *Attorney, Agent, or Firm* — PV IP PC; Wei Te Chung; Ude Lu

(57) ABSTRACT

The present application discloses an array substrate and a liquid crystal display panel. The array substrate includes an underlay substrate, a first electrode layer, a protection layer, and a second electrode layer that are disposed sequentially. The second electrode layer includes a pixel electrode, and the pixel electrode includes a pixel electrode main body and a conductive portion connected to each other. A rough surface is disposed on the conductive portion for draining redundant alignment liquid on the conductive portion such that a thickness of an alignment layer formed by curing the alignment liquid is even.

5 Claims, 8 Drawing Sheets

ARRAY SUBSTRATE AND LIQUID CRYSTAL DISPLAY PANEL

RELATED APPLICATIONS

This application is a Notional Phase of PCT Patent Application No. PCT/CN2021/094388 having international filing date of May 18, 2021, which claims the benefit of priority of Chinese Patent Application No. 202110465341.6 filed on Apr. 28, 2021. The contents of the above applications are all incorporated by reference as if fully set forth herein in their entirety.

FIELD OF INVENTION

The present application relates to a field of display technologies, especially to an array substrate and a liquid crystal display panel.

BACKGROUND OF INVENTION

In the field of display technologies, liquid crystal display technology is the most mature, and the liquid crystal display technology has penetrated deeply into modern life. A liquid crystal display panel has advantages of lightness and thinness, power saving, and soft picture, and is widely used in the field of display technology. The liquid crystal display panel comprises an array substrate and a color filter substrate disposed oppositely, and a liquid crystal layer sandwiched between the array substrate and the color filter substrate. To make the liquid crystal display panel have an ideal response speed and display effect, it is usually necessary to set a specific alignment direction for liquid crystal molecules in the liquid crystal layer. Namely, an alignment layer is disposed on a surface of the array substrate near the liquid crystal layer and a surface of the color filter substrate near the liquid crystal layer to provide the liquid crystal molecules with a pre-tilt angle such that an arrangement of the liquid crystal molecules in an initial state presents a certain regularity.

SUMMARY OF INVENTION

Technical Issue

During manufacturing of the alignment layer, alignment liquid is first transferred to the surface of the array substrate near the liquid crystal layer and the surface of the color filter substrate near the liquid crystal layer, and is cured. In the array substrate of the liquid crystal display panel, via holes are defined in many places, for example: a protection layer is usually disposed on a drain electrode of a thin film transistor, a pixel electrode is disposed on the protection layer, and a via hole is defined on the protection layer such that the pixel electrode is connected to the drain electrode. Because of existence of the via hole, a surface of the pixel electrode is in fact not flat. Namely, a portion of the pixel electrode corresponding to the via hole has an issue of an existing concavity forming a recess. The above recess is usually small and smooth. When the alignment layer is manufactured on the pixel electrode, based on fluidity and molecular tension action of the alignment liquid, the recess has an issue of accumulation of the alignment liquid. For the liquid crystal display panel with post spacers (PSs) formed on the color filter substrate (post spacer on color filter, POC), because there are no post spacers on the array substrate for draining the alignment liquid, the above issue of accumulation the alignment liquid of in the recess is particularly serious such that after being cured into a film, a thickness of a portion of the alignment layer in the recess is thicker than other portion of the alignment layer, which causes a defect of an uneven thickness of the entire alignment layer to further lower display quality of the liquid crystal display panel.

Technical Solution

The present application provides an array substrate and a liquid crystal display panel to mitigate an issue of an uneven overall thickness of a side of an alignment layer in a conventional liquid crystal display panel near the array substrate to improve display quality of the liquid crystal display panel.

In a first aspect, the present application provides an array substrate, the array substrate comprises:
an underlay substrate;
a first electrode layer disposed on the underlay substrate, wherein the first electrode layer comprises a source electrode and a drain electrode disposed at an interval;
a protection layer disposed on the underlay substrate and covering the first electrode layer, wherein a via hole is defined in a portion of the protection layer corresponding to the drain electrode; and
a second electrode layer disposed on the first electrode layer and the protection layer, wherein the second electrode layer comprises a pixel electrode, the pixel electrode comprises a pixel electrode main body and a conductive portion connected to each other, the pixel electrode main body is disposed on the protection layer, and the conductive portion is connected to the drain electrode through the via hole;
wherein a rough surface is disposed on the conductive portion and is configured to drain alignment liquid.

In some embodiments of the present application, at least a surface of a side of the conductive portion away from the first electrode layer and the protection layer is rough.

In some embodiments of the present application, the conductive portion comprises a periphery body and an internal core body connected to each other, the periphery body is disposed on the protection layer, the internal core body is filled in the via hole, and the periphery body is disposed around a periphery of the internal core body; and a rough surface is disposed on the periphery body and/or the internal core body.

In some embodiments of the present application, at least a surface of a side of the periphery body away from the first electrode layer and the protection layer is rough; and/or, at least a surface of a side of the internal core body away from the first electrode layer and the protection layer is rough.

In some embodiments of the present application, the rough surface is disposed on each of the periphery body and the internal core body; the periphery body and the internal core body are continuous and uninterrupted structures, and channels and/or protrusion structures are formed on the rough surface of each of the periphery body and the internal core body.

In some embodiments of the present application, the rough surface is disposed on the periphery body, the periphery body is a continuous and uninterrupted structure, and channels and/or protrusion structures are formed on the rough surface of the periphery body; the internal core body is an unroughened continuous and uninterrupted structure.

In some embodiments of the present application, at least one of the periphery body or the internal core body is a discontinuous structure, the discontinuous structure comprises a plurality of sub-portions, and the plurality of sub-portions are disposed at intervals and are electrically connected one another.

In some embodiments of the present application, the periphery body is the discontinuous structure, the internal core body is an unroughened continuous and uninterrupted structure.

In some embodiments of the present application, the periphery body is the discontinuous structure; and the internal core body is a continuous and uninterrupted structure, a rough surface is disposed on the internal core body, and channels and/or protrusion structures are formed on the rough surface of the internal core body.

In some embodiments of the present application, a rough surface is disposed on the pixel electrode main body and is configured to drain the alignment liquid.

In some embodiments of the present application, at least a surface of a side of the pixel electrode main body away from the first electrode layer and the protection layer is rough.

In some embodiments of the present application, the pixel electrode main body is a multi-domain structure; and the pixel electrode further comprises a connection line, and the conductive portion is connected to the pixel electrode main body through the connection line.

In a second aspect, the present application provides a display panel, the liquid crystal display panel comprises an array substrate, and the array substrate comprises:

an underlay substrate;

a first electrode layer disposed on the underlay substrate, wherein the first electrode layer comprises a source electrode and a drain electrode disposed at an interval;

a protection layer disposed on the underlay substrate and covering the first electrode layer, wherein a via hole is defined in a portion of the protection layer corresponding to the drain electrode; and a second electrode layer disposed on the first electrode layer and the protection layer, wherein the second electrode layer comprises a pixel electrode, the pixel electrode comprises a pixel electrode main body and a conductive portion connected to each other, the pixel electrode main body is disposed on the protection layer, and the conductive portion is connected to the drain electrode through the via hole;

wherein a rough surface is disposed on the conductive portion and is configured to drain alignment liquid.

In some embodiments of the present application, at least a surface of a side of the conductive portion away from the first electrode layer and the protection layer is rough.

In some embodiments of the present application, the conductive portion comprises a periphery body and an internal core body connected to each other, the periphery body is disposed on the protection layer, the internal core body is filled in the via hole, and the periphery body is disposed around a periphery of the internal core body; and a rough surface is disposed on the periphery body and/or the internal core body.

In some embodiments of the present application, the rough surface is disposed on each of the periphery body and the internal core body; the periphery body and the internal core body are continuous and uninterrupted structures, and channels and/or protrusion structures are formed on the rough surface of each of the periphery body and the internal core body.

In some embodiments of the present application, the rough surface is disposed on the periphery body, the periphery body is a continuous and uninterrupted structure, and channels and/or protrusion structures are formed on the rough surface of the periphery body; the internal core body is an unroughened continuous and uninterrupted structure.

In some embodiments of the present application, at least one of the periphery body or the internal core body is a discontinuous structure, the discontinuous structure comprises a plurality of sub-portions, and the plurality of sub-portions are disposed at intervals and are electrically connected one another.

In some embodiments of the present application, the periphery body is the discontinuous structure, the internal core body is an unroughened continuous and uninterrupted structure.

In some embodiments of the present application, the periphery body is the discontinuous structure; and the internal core body is a continuous and uninterrupted structure, a rough surface is disposed on the internal core body, and channels and/or protrusion structures are formed on the rough surface of the internal core body.

Advantages

The present application provides an array substrate and a liquid crystal display panel, the array substrate comprises an underlay substrate, a first electrode layer, a protection layer, and a second electrode layer that are disposed sequentially; the second electrode layer comprises a pixel electrode, and the pixel electrode comprises a pixel electrode main body and a conductive portion connected to each other. A rough surface is disposed on the conductive portion to improve infiltration and fluidity of alignment liquid on the conductive portion to achieve a purpose of drainage such that after the alignment liquid is cured to form a film, a thickness of the alignment layer formed therefrom is even, which effectively prevents an issue of uneven brightness (Mura) of the liquid crystal display panel due to accumulation of redundant alignment liquid on the conductive portion to further improve display quality of the liquid crystal display panel.

DETAILED DESCRIPTION OF PREFERRED EMBODIMENTS

To make the above-mentioned purpose, features and advantages of the present invention more clear and understandable, the preferred embodiment of the present invention is specially cited below, with the accompanying drawings, and the detailed description is as follows.

In the description of the present application, it should be understood that terminologies "center", "longitudinal", "transverse", "length", "width", "thickness", "upper", "lower", "front", "rear", "left", "side", "vertical", "horizontal", "top", "bottom", "inner", "outer", "clockwise", "counterclockwise" for indicating relations of orientation or position are based on orientation or position of the accompanying drawings, are only for the purposes of facilitating description of the present application and simplifying the description instead of indicating or implying that the referred device or element must have a specific orientation or position, must to be structured and operated with the specific orientation or position. Therefore, they should not be understood as limitations to the present application. Furthermore, terminologies "first", "second" are only for the purposes of description, and cannot be understood as indication or implication of comparative importance or a number of technical features. Therefore, a feature limited with "first", "second" can expressly or implicitly include one or more features. In the description of the present application, a meaning of "a plurality of" is two or more, unless there is a clear and specific limitation otherwise.

The present application provides an array substrate, and the array substrate can be applied to the liquid crystal display panel to mitigate the issue of an uneven thickness of the entire alignment layer due to accumulation of redundant alignment liquid in the conventional technology. The array substrate can be a top gate array substrate, and can also be a bottom gate array substrate. A top gate array substrate is taken as an example for description as follows.

Figure 1:
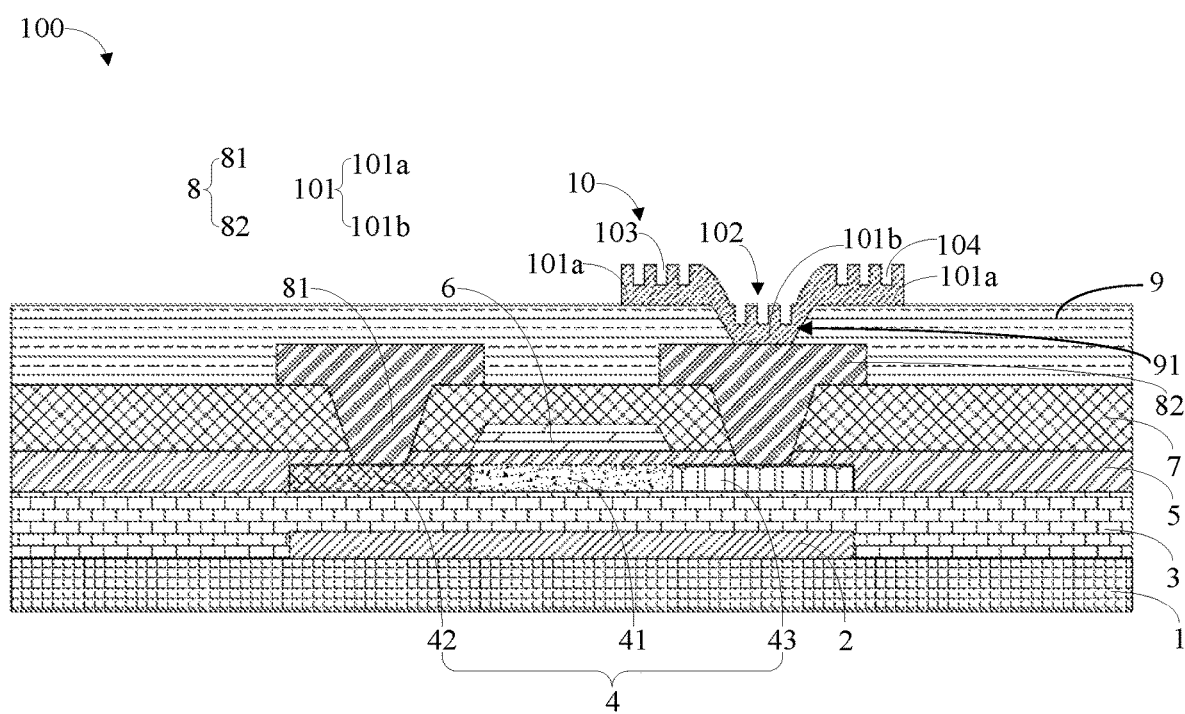
FIG. 1 is a schematic cross-sectional view of an array substrate provided by an embodiment of the present application.

With reference to FIG. 1, the array substrate 100 comprises: an underlay substrate 1, a light shielding layer 2, a buffer layer 3, semiconductor layer 4, a gate insulating layer 5, a gate electrode layer 6, an inter-layer insulating layer 7, a first electrode layer 8, a protection layer 9, and a second electrode layer.

Specifically, underlay substrate 1 can be a rigid underlay, and an exemplary material of the rigid underlay is glass.

The light shielding layer 2 is disposed on the underlay substrate 1. The light shielding layer 2 is a patterned single layer or a laminated structure. Material of the light shielding layer 2 is opaque conductive material, the opaque conductive material, for example, can be single metal such as molybdenum (Mo), aluminum (Al), copper (Cu), titanium (Ti), etc., and can also be alloy material such as molybdenum titanium nickel (MoTiNi) alloy. For a method of manufacturing the light shielding layer 2, one can refer to the conventional technology, which will not be repeatedly described here.

The buffer layer 3 is disposed on the underlay substrate 1 and completely covers the light shielding layer 2. The buffer layer 3 can be a single layer structure or a laminated structure, Material thereof can be at least one of silica (SiOx), silicon nitride (SiNx), or silicon oxynitride (SiOxNy), wherein x and y are positive integers. For a method of manufacturing the buffer layer 3, one can refer to the conventional technology, which will not be repeatedly described here.

Material of the semiconductor layer 4, for example, can be semiconductor material such us polysilicon, amorphous silicon, etc. The semiconductor layer 4 comprises an active region, and for structural composition of the active region, one can refer to the conventional technology. For example, the active region comprises a channel region 41, and a first doping region 42 and a second doping region 43 located on two sides of the channel region 41. Ion doping type and doping concentration of the first doping region 42 and the second doping region 43 can be chosen according to actual needs. For a method of manufacturing the semiconductor layer 4, one can refer to the conventional technology, which will not be repeatedly described here.

The gate insulating layer 5 is disposed on the buffer layer 3 and covers the semiconductor layer 4. The gate insulating layer 5 can be a single layer structure or a laminated structure. Material of the gate insulating layer 5 can be at least one of $SiO_x$, $SiN_x$, or $SiO_xN_y$. For example, the gate insulating layer 5 is a laminated structure formed by alternately laminating $SiO_x$ layers and $SiN_x$ layers. For a method of manufacturing the gate insulating layer 5, one can refer to the conventional technology, which will not be repeatedly described here.

The gate electrode layer 6 is disposed on the gate insulating layer 5, and a position of the gate electrode layer 6 corresponds to the channel region. The gate electrode layer 6 can be a single layer structure or a laminated structure. Material of the gate electrode layer 6 can be conductive material such as metal, metal oxide, alloy, etc. For example, material of the gate electrode layer 6 is copper. For a method of manufacturing the gate electrode layer 6, one can refer to the conventional technology, which will not be repeatedly described here.

The inter-layer insulating layer 7 is disposed on the gate insulating layer 5 and covers the gate electrode layer 6. The inter-layer insulating layer 7 can be a single layer structure or a laminated structure. Material of the inter-layer insulating layer 7 can be at least one of silica ($SiO_x$), silicon nitride ($SiN_x$), or silicon oxynitride ($SiO_xN_y$). For a method of manufacturing the inter-layer insulating layer 7, one can refer to the conventional technology, which will not be repeatedly described here.

The first electrode layer 8 is disposed on the inter-layer insulating layer 7. The first electrode layer 8 can be a single layer structure or a laminated structure. Material of the first electrode layer 8 can be conductive material such as metal, metal oxide, alloy, etc. The first electrode layer 8 comprises a source electrode 81 and a drain electrode 82 disposed at an interval. The source electrode 81 penetrates the inter-layer insulating layer 7 and the gate insulating layer 5 to connect with the first doping region 42. The drain electrode 82 penetrates the inter-layer insulating layer 7 and the gate insulating layer 5 to connect with the second doping region 43. For a method of manufacturing the first electrode layer 8, one can refer to the conventional technology, which will not be repeatedly described here.

The protection layer 9 is disposed on the inter-layer insulating layer 7 and covers the first electrode layer 8. In the embodiment of the present application, the protection layer 9 is a planarization layer and has a function of improving flatness of a surface of the layer structure such that the first electrode layer 8 and the second electrode layer are insulated from each other. The protection layer 9 can be a single layer structure or a laminated structure. Material of the protection layer 9 can be a polymer film on array (PFA). A via hole 91 is defined in a portion of the protection layer 9 corresponding to the drain electrode 82. For a method of manufacturing the protection layer 9, one can refer to the conventional technology, which will not be repeatedly described here. Furthermore, the protection layer 9 can also be a passivation layer, an inter-layer insulating layer, etc.

The second electrode layer is disposed on the first electrode layer 8 and the protection layer 9. The second electrode layer can be a single layer structure or a laminated structure.

Material of the second electrode layer can be transparent metal oxide, for example indium tin oxide (In2O3:Sn, ITO). For a method of manufacturing the second electrode layer, one can refer to the conventional technology, which will not be repeatedly described here.

The second electrode layer comprises a pixel electrode 10, the pixel electrode 10 is disposed on the protection layer 9 and is insulated from the first electrode layer 8. The pixel electrode 10 comprises a pixel electrode main body (not shown in FIG. 1) and a conductive portion 101 connected to each other. The pixel electrode main body is disposed on the protection layer 9. The conductive portion 101 extends through the via hole 91 and is connected to the drain electrode 82. The conductive portion 101 comprises a periphery body 101a and an internal core body 101b. The periphery body 101a and the internal core body 101b are formed into one piece. The periphery body 101a is disposed on the protection layer 9, and the internal core body 101b is filled in the via hole 91.

It should be explained that during manufacturing of the second electrode layers, a physical vapor deposition (PVD) process can be employed first to deposit an entire surface of a second electrode material layer on the protection layer 9, and then a yellow light process and an etching process are used to manufacture a patterned structure. Because of existence of the via hole 91, after an entire surface of the second electrode material layer is formed, the surface of the second electrode material layer is usually not flat. Namely, a portion of the second electrode material layer corresponding to the via hole 91 has an issue of an existing concavity forming a recess 102. Because the recess 102 is smaller and has a smooth surface, when the alignment layer is manufactured on the second electrode layer, the recess 102 has an issue of accumulation of the alignment liquid, which further causes a defect of an uneven thickness of the entire alignment layer.

As such, a rough surface is disposed on the conductive portion 101 and is configured to drain redundant alignment liquid in the recess 102. At least a surface of a side of the conductive portion 101 away from the first electrode layer 8 and the protection layer 9 is rough to serve as a drainage structure for the alignment liquid and has a function of draining redundant alignment liquid in the recess 102. For example, channels and/or protrusion structures can be disposed to achieve the purpose of a rough surface. Furthermore, it can be at least a surface of a side of the periphery body 101a away from the first electrode layer 8 and the protection layer 9 being rough. It can also be at least a surface of a side of the internal core body 101b away from the first electrode layer 8 and the protection layer 9 being rough. Alternatively, at least a surface of a side of the periphery body 101a away from the first electrode layer 8 and the protection layer 9 is rough, and at least a surface of a side of the internal core body 101b away from the first electrode layer 8 and the protection layer 9 is rough.

Figure 2:
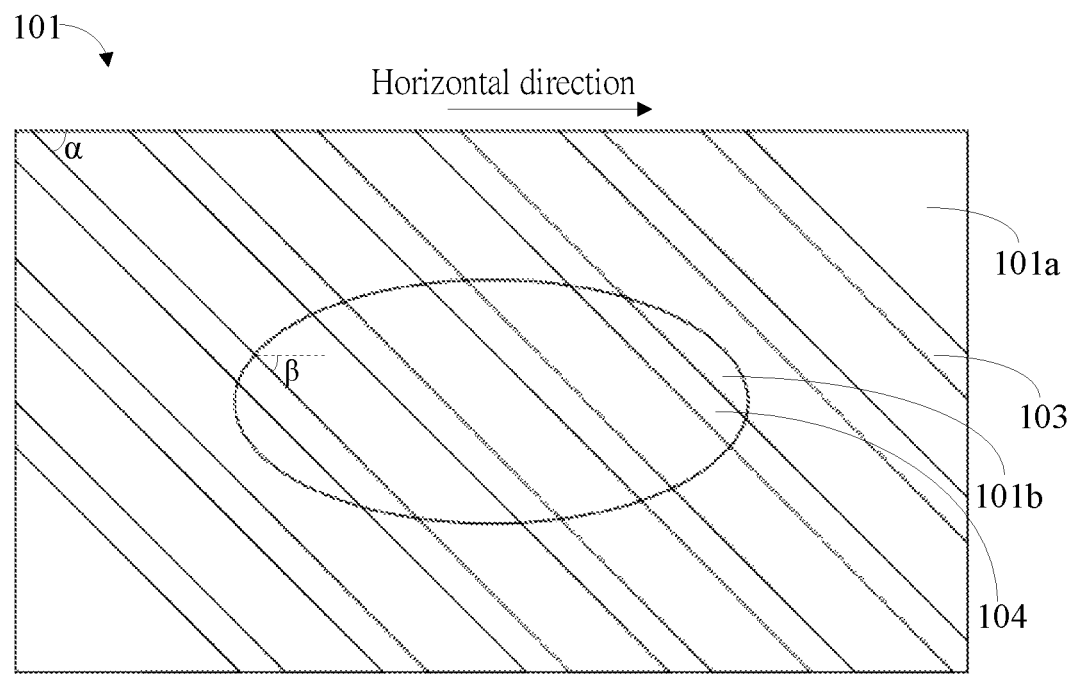
FIG. 2 is a top view of a conductive portion provided by an embodiment of the present application.

With reference to FIGS. 1 and 2, a surface of a side of the periphery body 101a away from the first electrode layer 8 and the protection layer 9 is rough, and a surface of a side of the internal core body 101b away from the first electrode layer 8 and the protection layer 9 is rough. Both the periphery body 101a and the internal core body 101b are continuous and uninterrupted structures. Along a horizontal direction, a plurality of first channels 103 are formed on a surface of a side of the periphery body 101a away from the first electrode layer 8 and the protection layer 9 and are parallel to one another at intervals. a plurality of second channels 104 are formed on a surface of a side of the internal core body 101b away from the first electrode layer 8 and the protection layer 9 and are parallel to one another at intervals. Each of the first channels 103 and the horizontal direction form an included angle α therebetween, and each of the second channels 104 and the horizontal direction form an included angle β therebetween. Both the included angle α and the included angle β, for example, are 45 degrees.

It should be explained that the first channels and the second channels can be manufactured by a yellow light process and an etching process. Preferably, the first channels and the second channels are manufactured by the same photomask. Property parameters of the first channels and the second channels such as shapes, sizes, arrangements, etc. are not limited specifically, and can be chosen according to actual needs, and they only have to fulfill the following condition: under the premise that the array substrate works normally, alignment liquid in the recess can be drained. Shapes, sizes, and arrangements of the first channels and the second channels can be the same and can also be different. Property parameters (for example, shape, size, arrangement, etc.) among the first channels can be the same and can also be different. Similarly, property parameters (for example, shape, size, arrangement, etc.) among the second channels can be the same and can also be different.

The angle values of the included angle α and the included angle β are not limited specifically, and can be any value in a range from 0 to 180 degrees. For example, the included angle α and the included angle β can be integers such as 0 degrees, 15 degrees, 20 degrees, 30 degrees, 45 degrees, 60 degrees, 80 degrees, 90 degrees, 100 degrees, 115 degrees, 135 degrees, 155 degrees, 180 degrees, etc., and the angle value can also be non-integers. The included angle α and the included angle β can be the same and can also be different.

Furthermore, the first channels and/or the second channels can be replaced with protrusion structures, or protrusion structures are disposed in the first channels and/or the second channels (for example: on a channel wall), or protrusion structures are disposed between adjacent two of the first channels and/or adjacent two of the second recess.

In some embodiments of the present application, the periphery body 101a is a continuous and uninterrupted structure, and at least one channel and/or at least one protrusion structure is formed on a surface of a side of the periphery body 101a away from the first electrode layer 8 and the protection layer 9. The internal core body 101b is an unroughened continuous and uninterrupted structure.

Figure 3:
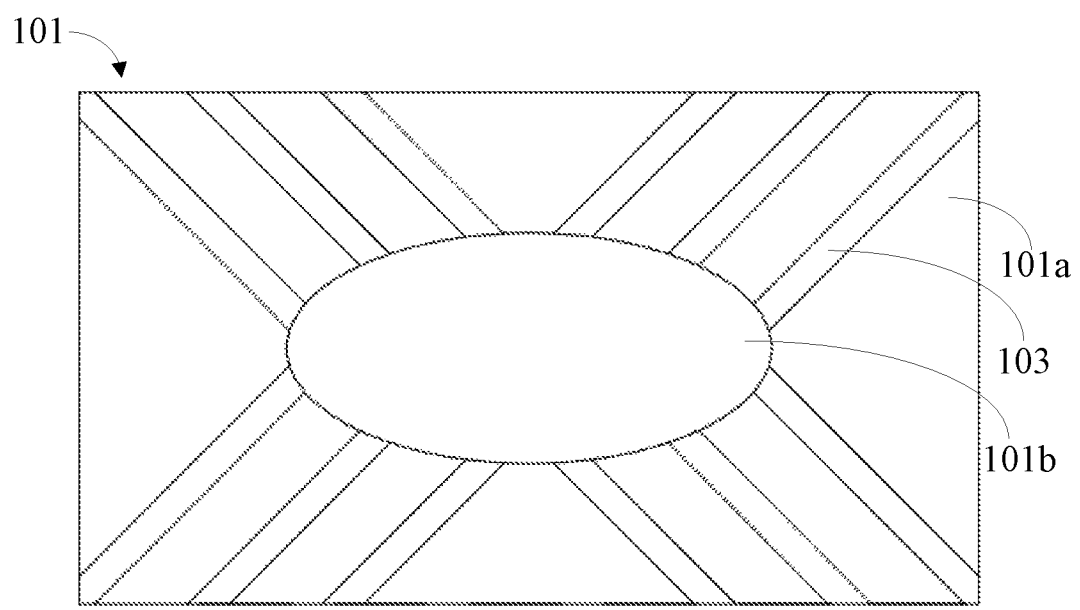
FIG. 3 is a top view of a conductive portion provided by another embodiment of the present application.

For example, with reference to FIG. 3, the periphery body 101a and the internal core body 101b are continuous and uninterrupted structures. Along the horizontal direction, a plurality of first channels 103 are defined on a surface of a side of the periphery body 101a away from first electrode layer and the protection layer at intervals. The first channels 103 are distributed in a divergent state centered on the internal core body 101b. Namely, the first channels 103 extend along different directions. The internal core body 101b is a unroughened continuous and uninterrupted structure. The advantage of such design is that: redundant alignment liquid on the internal core body 101b can be drained effectively without lowering a contact impedance of the internal core body 101b.

In some embodiments of the present application, at least one of the periphery body 101a or the internal core body 101b is a discontinuous structure, and the discontinuous structure comprises a plurality of sub-portions. The sub-portions are disposed at intervals and are electrically connected to one another.

Figure 4:
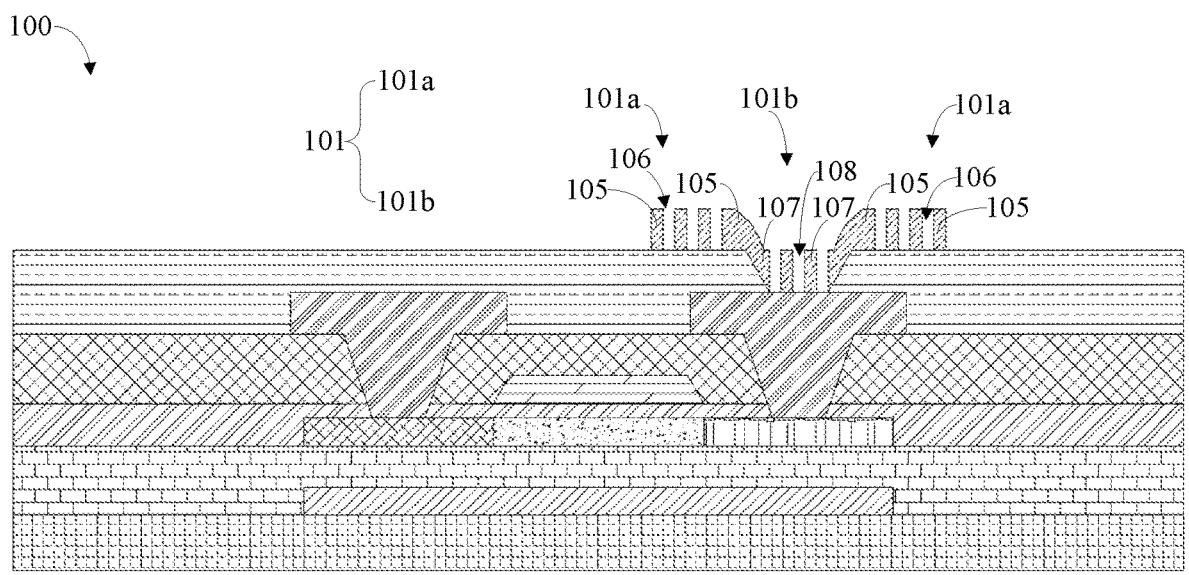
FIG. 4 is a schematic cross-sectional view of an array substrate provided by another embodiment of the present application.

As an example, FIG. 4 illustrates a schematic cross-sectional view of an array substrate provided by another embodiment of the present application, and a difference thereof from the array substrate shown in FIG. 1 is that a configuration of the conductive portion 101 is different. With reference to FIG. 4, in the conductive portion 101 of the array substrate 100, both the periphery body 101a and the internal core body 101b are discontinuous structures. The periphery body 101a is composed of a plurality of periphery body sub-portions 105 parallel to one another at intervals. The periphery body sub-portions 105 are arranged along a horizontal direction and are electrically connected to one another. A first gap 106 is defined between adjacent two of the periphery body sub-portions 105. The internal core body 101b comprises a plurality of internal core body sub-portions 107 parallel to one another at intervals. The internal core body sub-portions 107 are arranged along the horizontal direction and are electrically connected to one another, and a second gap 108 is defined between adjacent two of the internal core body sub-portions 107.

It should be explained that property parameters (for example, shape, size, arrangement, etc.) among the periphery body sub-portions can be the same and can also be different. Similarly, a plurality of internal core body sub-portions property parameters (for example, shape, size, arrangement, etc.) can be the same and can also be different.

Numbers, shapes, sizes, and arrangement of the first gap and the second gap are not limited specifically, can be chosen according to actual needs. For example, the second gap can also be arranged along a vertical direction. Also for example, a gap width of each of the first gap and the second gap is 2.5 microns.

Furthermore, an included angle between the first gap and the horizontal direction, and an included angle between the second gap and the horizontal direction are not limited specifically, and can be any value in a range from 0 degrees to 180 degrees, for example, can be integers such as 0 degrees, 15 degrees, 20 degrees, 30 degrees, 45 degrees, 60 degrees, 80 degrees, 90 degrees, 100 degrees, 115 degrees, 135 degrees, 155 degrees, 180 degrees, etc., and can also be non-integers.

Figure 5:
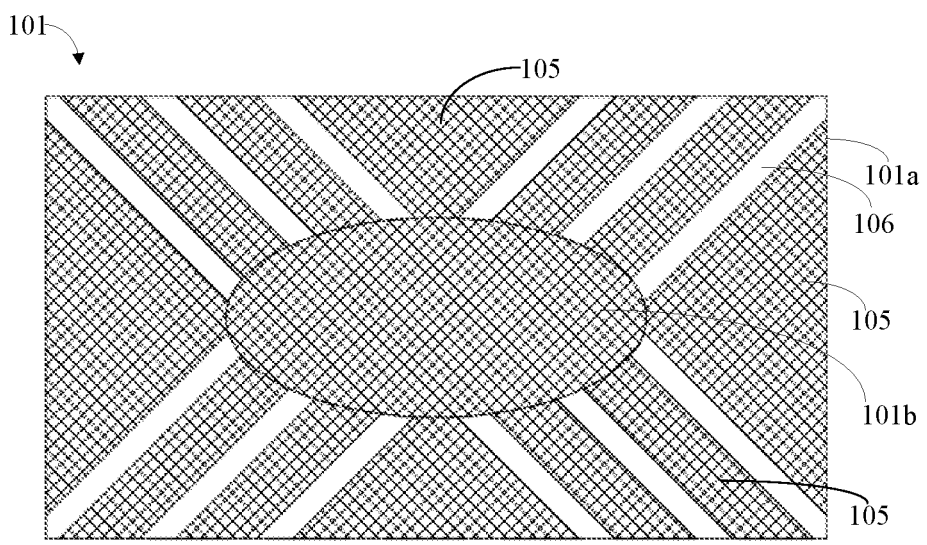
FIG. 5 is a top view of a conductive portion provided by another embodiment of the present application.

For example, as shown in FIG. 5, in the conductive portion 101, the periphery body 101a is a discontinuous structure. The periphery body 101a is composed of a plurality of periphery body sub-portions 105 at intervals. The periphery body sub-portions 105 are distributed in a divergent state centered on the internal core body 101b. Namely, the periphery body sub-portions 105 extend along different directions, and a first gap 106 is defined between adjacent two of the periphery body sub-portions 105. The internal core body 101b is a unroughened continuous and uninterrupted structure. The advantage of such design is that redundant alignment liquid on the internal core body 101b can be drained effectively without lowering a contact impedance of the internal core body 101b.

Figure 6:
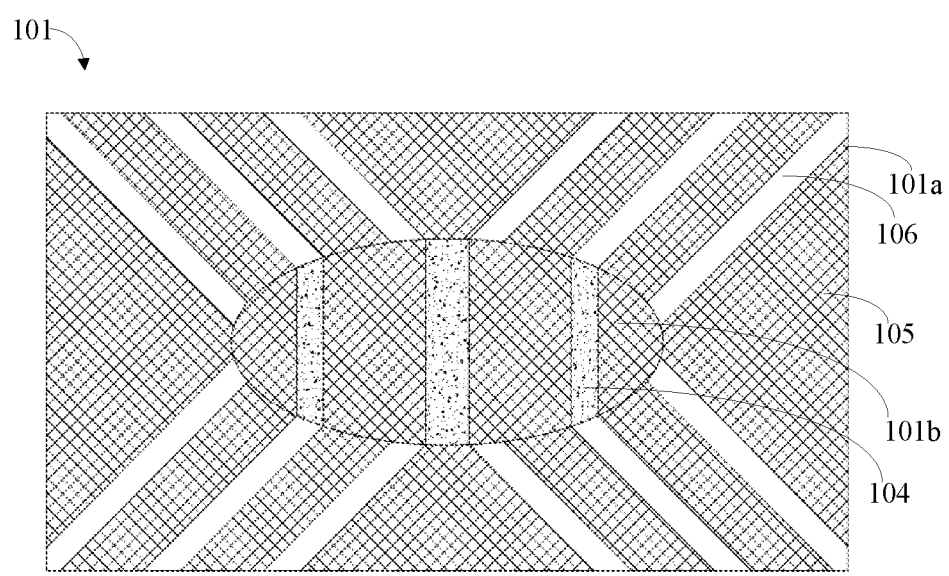
FIG. 6 is a top view of a conductive portion provided by another embodiment of the present application.

For example, as shown in FIG. 6, in the conductive portion 101, the periphery body 101a is a discontinuous structure. The periphery body 101a is composed of a plurality of periphery body sub-portions 105 at intervals. The periphery body sub-portions 105 are distributed in a divergent state centered on the internal core body 101b. Namely, the periphery body sub-portions 105 extend along different directions, and a first gap 106 is defined between adjacent two of the periphery body sub-portions 105. The internal core body 101b is a continuous and uninterrupted structure, and a plurality of second channels 104 are formed on a surface of a side of the internal core body 101b away from first electrode layer and the protection layer and are parallel to one another at intervals. The second channels 104 are arranged along the horizontal direction, and each of the second channels 104 is perpendicular to the horizontal direction.

In some embodiments of the present application, at least a surface of a side of the pixel electrode main body away from the first electrode layer and the protection layer is rough to further drain redundant alignment liquid on the conductive portion. For example, the pixel electrode main body can be multi-domain structure.

Figure 7:
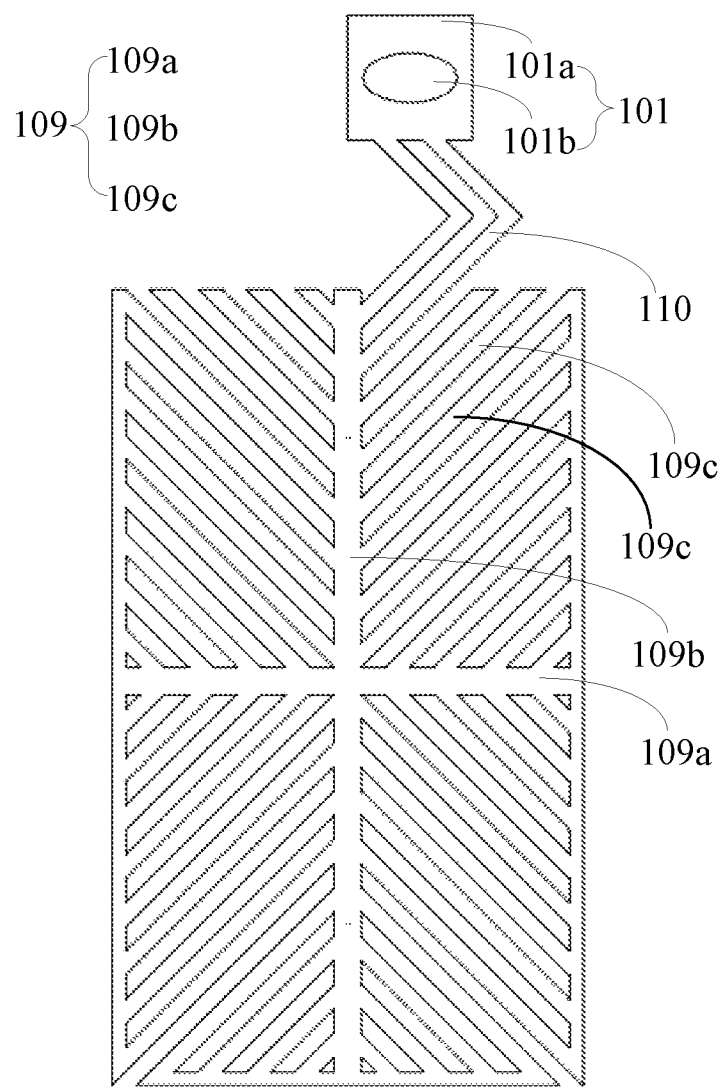
FIG. 7 is a top view of a pixel electrode provided by an embodiment of the present application.

For example, with reference to FIG. 7, the pixel electrode 10 comprises a conductive portion 101, a pixel electrode main body 109, and a connection line 110. The conductive portion 101 is connected to the pixel electrode main body 109 through the connection line 110. The conductive portion 101 is composed of a periphery body 101a and an internal core body 101b connected to each other. The periphery body 101a is disposed around a periphery of the internal core body 101b. The pixel electrode main body 109 is a four-domain structure. The pixel electrode main body 109 comprises a first trunk electrode 109a, a second trunk electrode 109b, and a plurality of branch electrodes 109c. The first trunk electrode 109a and the second trunk electrode 109b are perpendicular to each other to form a cross shape to form four domains arranged in a four-square shape. The plurality of branch electrodes 109c are disposed in each domain and are parallel to one another at intervals. The branch electrodes 109c in each domain have the same extension direction, and the branch electrodes 109c in different domains have different extension directions. Furthermore, adjacent two of the domains are symmetrical relative to the first trunk electrode 109a or the second trunk electrode 109b, and two of the domains located on a diagonal are axisymmetric relative to an intersection between the first trunk electrode 109a and the second trunk electrode 109b.

It should be explained that pixel electrode main body 109 can also be other multi-domain structure, for example, the pixel electrode main body 109 is an eight-domain structure, which is not limited here, and can be chosen according to actual needs.

A person of ordinary skill in the art can understand that the array substrate of the embodiment of the present application further comprises some other known structures, for example: a data line connected to the drain electrode, a scan line connected to the gate electrode, a common electrode, a passivation layer, a capacitor electrode, etc. A person of ordinary skill in the art can make arrangements according to demands.

Figure 8:
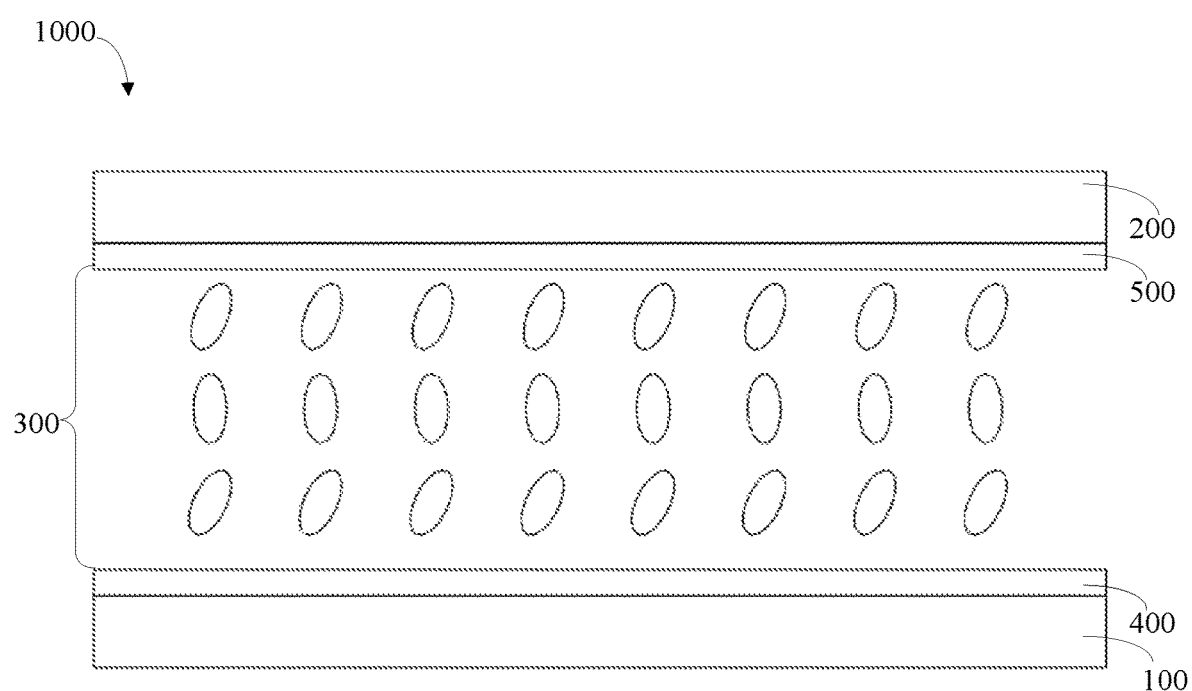
FIG. 8 is a schematic structural view of a liquid crystal display panel provided by an embodiment of the present application.

The embodiment of the present application also provides a liquid crystal display panel. The liquid crystal display panel can be a common liquid crystal display panel, and can also be a multi-domain liquid crystal display panel. With reference to FIG. 8, the liquid crystal display panel 1000 comprises: an array substrate 100, a color filter substrate 200, a liquid crystal layer 300, a first alignment layer 400, and a second alignment layer 500.

The array substrate 100 is any array substrate 100 disclosed in any embodiment of the present application.

Material of the first alignment layer 400, for example, is polyimide. The first alignment layer 400 is disposed on a side of the array substrate 100 near the liquid crystal layer 300. The color filter substrate 200 is disposed opposite to the array substrate 100. The liquid crystal layer 300 is sandwiched between the array substrate 100 and the color filter substrate 200. Material of the second alignment layer 500, for example, is polyimide. The second alignment layer 500 is disposed on a side of the color filter substrate 200 near the liquid crystal layer 300.

A person of ordinary skill in the art can understand that the liquid crystal display panel of the embodiment of the present application can further comprise some other known structures, for example: a post spacer (PS), a polarizer, etc.

The liquid crystal display panel of the present application can be applied to various electronic products with display functions, such as mobile phones, computers, digital cameras, digital video cameras, game consoles, audio reproduction devices, information terminals, smart wearable devices, smart weighing electronic scales, car monitors, televisions, and other products or components with display functions. The smart wearable devices can be smart bracelets, smart watches, smart glasses, etc.

The application has been described by the above-mentioned related embodiments. However, the above-mentioned embodiments are only examples for implementing the present invention. It must be pointed out that the disclosed embodiments have no limit to the scope of the present invention. On the contrary, modifications and equivalent arrangements included in the spirit and scope of the claims are all included in the scope of the present invention.

What is claimed is:

1. An array substrate, wherein the array substrate comprises:
    an underlay substrate;
    a first electrode layer disposed on the underlay substrate, wherein the first electrode layer comprises a source electrode and a drain electrode disposed at an interval;
    a protection layer disposed on the underlay substrate and covering the first electrode layer, wherein a via hole is defined in a portion of the protection layer corresponding to the drain electrode; and
    a second electrode layer disposed on the first electrode layer and the protection layer, wherein the second electrode layer comprises a pixel electrode, the pixel electrode comprises a pixel electrode main body and a conductive portion connected to each other, the pixel electrode main body is disposed on the protection layer, and the conductive portion is connected to the drain electrode through the via hole;
    wherein a rough surface is disposed on the conductive portion and is configured to drain alignment liquid;
    wherein the conductive portion comprises a periphery body and an internal core body connected to each other, the periphery body is disposed on the protection layer, the internal core body is filled in the via hole, and the periphery body is disposed around a periphery of the internal core body; and the rough surface is disposed on the periphery body and/or the internal core body; and
    wherein the rough surface is disposed on the periphery body, the periphery body is a continuous and uninterrupted structure, and channels and/or protrusion structures are formed on the rough surface of the periphery body; and the internal core body is an unroughened continuous and uninterrupted structure.

2. An array substrate, wherein the array substrate comprises:
    an underlay substrate;
    a first electrode layer disposed on the underlay substrate, wherein the first electrode layer comprises a source electrode and a drain electrode disposed at an interval;
    a protection layer disposed on the underlay substrate and covering the first electrode layer, wherein a via hole is defined in a portion of the protection layer corresponding to the drain electrode; and
    a second electrode layer disposed on the first electrode layer and the protection layer, wherein the second electrode layer comprises a pixel electrode, the pixel electrode comprises a pixel electrode main body and a conductive portion connected to each other, the pixel electrode main body is disposed on the protection layer, and the conductive portion is connected to the drain electrode through the via hole;
    wherein a rough surface is disposed on the conductive portion and is configured to drain alignment liquid;
    wherein the conductive portion comprises a periphery body and an internal core body connected to each other, the periphery body is disposed on the protection layer, the internal core body is filled in the via hole, and the periphery body is disposed around a periphery of the internal core body; and the rough surface is disposed on the periphery body and/or the internal core body;
    wherein at least one of the periphery body or the internal core body is a discontinuous structure, the discontinuous structure comprises a plurality of sub-portions, and the plurality of sub-portions are disposed at intervals and are electrically connected to one another; and
    wherein the periphery body is the discontinuous structure, and the internal core body is an unroughened continuous and uninterrupted structure.

3. An array substrate, wherein the array substrate comprises:
    an underlay substrate;
    a first electrode layer disposed on the underlay substrate, wherein the first electrode layer comprises a source electrode and a drain electrode disposed at an interval;
    a protection layer disposed on the underlay substrate and covering the first electrode layer, wherein a via hole is defined in a portion of the protection layer corresponding to the drain electrode; and
    a second electrode layer disposed on the first electrode layer and the protection layer, wherein the second electrode layer comprises a pixel electrode, the pixel electrode comprises a pixel electrode main body and a conductive portion connected to each other, the pixel electrode main body is disposed on the protection layer, and the conductive portion is connected to the drain electrode through the via hole;
    wherein a rough surface is disposed on the conductive portion and is configured to drain alignment liquid; and
    wherein the rough surface is disposed on the pixel electrode main body and is configured to drain the alignment liquid.

4. The array substrate according to claim 3, wherein at least a surface of a side of the pixel electrode main body away from the first electrode layer and the protection layer is rough.

5. The array substrate according to claim 4, wherein the pixel electrode main body is a multi-domain structure, the pixel electrode further comprises a connection line, and the conductive portion is connected to the pixel electrode main body through the connection line.

* * * * *